Jan. 14, 1969   R. E. GALER   3,421,703
KILN FEED CONTROL
Original Filed Aug. 27, 1965
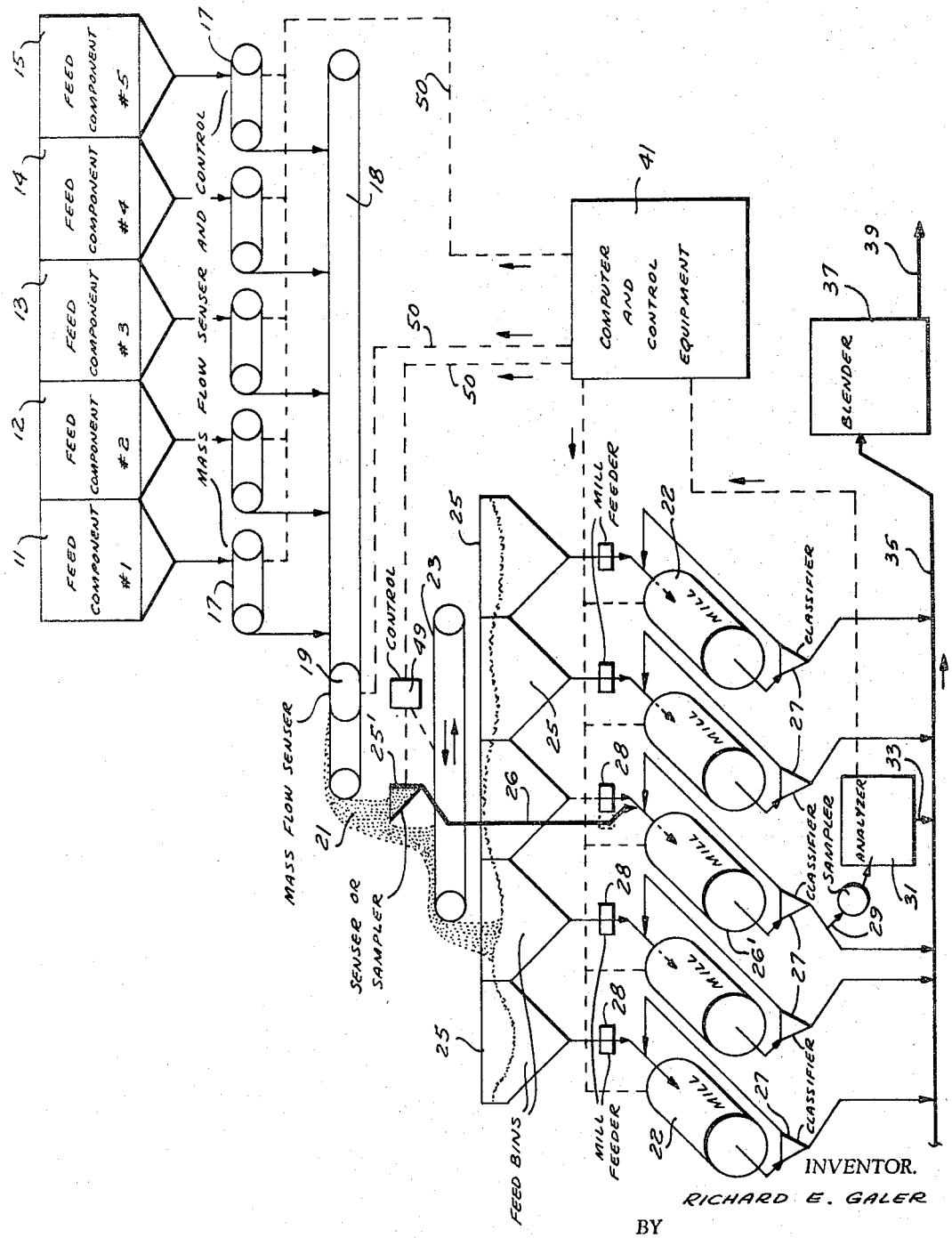
INVENTOR.
RICHARD E. GALER
BY
Kane, Dalsimer & Kane
ATTORNEYS

United States Patent Office

3,421,703
Patented Jan. 14, 1969

3,421,703
KILN FEED CONTROL
Richard E. Galer, Alpena, Mich., assignor, by mesne assignments, to National Gypsum Company, Buffalo, N.Y., a corporation of Delaware
Continuation of application Ser. No. 483,178, Aug. 27, 1965. This application Apr. 4, 1968, Ser. No. 718,952
U.S. Cl. 241—25                                    21 Claims
Int. Cl. B02c 21/00; B02c 23/00; B02c 25/00

ABSTRACT OF THE DISCLOSURE

This invention is directed to a control of the chemical proportions of kiln feed composition in the manufacture of portland cement. This is achieved by supplying a plurality of streams of proportioned ingredients which are fed sequentially to pulverizing mills. During the entire feed period, samples are taken and analyzed so that the final control of supplied material can be established through a control exercised by an appropriate computer and control unit.

---

This application is a continuation of application Ser. No. 483,178, filed Aug. 27, 1965, and now abandoned.

This invention relates to a method and apparatus by which the chemical proportions of kiln feed composition desirable in the manufacture of portland cement can be controlled rigidly and maintained continuously in approximately an optimum state.

In the broadest sense, the invention is especially usable in connection with the establishment of the feed composition control in a cement plant of the dry process type which contains a large number of raw ingredient mills. In a modified form the invention is equally usable in plants with one or more raw ingredient mills. These raw ingredient mills grind a mix of raw materials that have been proportioned from a common set of proportioners and then the pulverized material is discharged into a common stream. To eliminate stratification by composition of these pulverulent materials in the common stream, they are passed through a blender which causes the total output of all mills to be essentially homogeneous in composition throughout the entire cross section of the stream. When a large multiple number of grinding mills are operated in parallel a blender of relatively small size may be used since back mixing of the stream is not necessary to level out composition changes caused by proportioner error. Ths invention seeks to provide such control over the proportioning of the raw materials that the combined output stream when properly and adequately blended will be uniformly of satisfactory preestablished chemical composition. That is, any and all segments of the stream will be within specifications, and changes in composition with respect to time will be within such narrow limits as to be insignificant with respect to process performance and product quality. Such limits are discussed in detail later. This invention also seeks to provide dynamic chemical composition control of pulverulent material prepared for cement kiln feed. This eliminates the need for several large and costly homogenizing silos that are otherwise required to provide equally rigid chemical composition control.

In the feeding of the proportioned raw materials to the kiln of the cement manufacturing plant the present invention is independent of any minimum number of mills which may be required in order for this composition technique to give satisfactory performance characteristics without homogenizing silos. As will be apparent, the proportioning becomes a function of the total length of time required to make a detection of the material and to establish either that the proportions instantaneously being fed are correct or, if in error, to provide for making correction compositionwise. Where the correction is necessary the invention provides rapid means by which the corrective action may be realized.

According to many present forms of control of the manufacture of cement, the proportions used ordinarily are selected after general observations made by the mix chemist, rather than by the establishment of precise stoichiometric relationships or calculations. It is recognized in the industry that control of such general "hit or miss" type frequently leads either to a product having characteristics which exceed or fall short of specification requirements. In many instances, where an inefficient control is established and the end-product exceeds specification requirements, the net result is high preparation costs and a needless strain on the kiln in which the cement clinker is to be prepared.

The invention will be set forth on an assumption that the complete system comprises any selected number of mills each designed to deliver some average selected tonnage of pulverulent kiln feed at some particular selected mesh fineness. This requirement makes the necessary total feed rate to the raw grind operation approximately the product of the average tons required per hour times the number of mill units involved. The feed proportioning equipment, accordingly, must be capable of handling combined raw material feed components of the desired amount, bearing in mind that each feed mill bin usually has a storage capacity covering from several minutes to a few hours of operation. However, it is preferred that the rate of the combined weight of proportioned raw materials be adjusted to match the total grinding rates of the mills so as to require continuous feeding of the mill feed bins in a prearranged and orderly sequence. It is found that continuous operation of the proportioning devices leads to far better accuracy of composition control than a start and stop type of operation.

In the preparation of mixes for the purpose to which this invention is directed, the cement chemist normally is obliged to supervise and control the mix composition. The four portland cement compounds or phases with which the cement chemist is particularly concerned are those known as the tricalcium silicate ($3CaO \cdot SiO_2$), the dicalcium silicate ($2CaO \cdot SiO_2$), the tricalcium aluminate ($3CaO \cdot Al_2O_3$) and the tetracalcium aluminoferrite [$4CaO \cdot Al_2O_3 \cdot Fe_2O_3$]. These active components are commonly recognized in the cement industry by abbreviated symbols, such as, respectively, $C_3S$, $C_2S$, $C_3A$, $C_4AF$. In each instance, the active materials making up the foregoing compounds are oxides of; calcium (Ca), silica (Si), aluminum (Al), and iron (Fe). A small amount of magnesium oxide (MgO) is present in most portland cements. The exact amount varies according to the composition of raw materials that a given cement plant must use. Since the magnesium oxide does not combine in any of the cement phases it is usually treated as an inert material. However, because of its deleterious expansion effect in concrete, the amount of it in cement is purposely kept small and usually it is less than 3%. This percentage is selected even though ASTM specifications allow 5% in Types I, II, III, and IV, and 4% in Type V cement. From the foregoing, the total oxides of the four major elements in question provide and account for something in the range of 95% to 99% of the weight of the clinker finally produced. The balance of the clinker content is mostly oxides of magnesium, sodium, potassium, and sulphur, accompanied by traces of refractory metal oxides.

In practicing the control of kiln feed composition, the cement chemist naturally seeks to keep trace and deleterious materials at a minimum value in the clinker. The chief concern is to produce a cement that will meet strength specifications when the clinker is pulverized to a suitable fineness. It is known that the strength potential of a cement of a given fineness is a function of the actual composition with respect to the four cement compounds or phases. This allows that other factors also have an influence and in some cases to a significant degree. It is further known that the actual composition with respect to the four cement phases is not determined by the chemical composition alone but is influenced by the cooling rates applied to the cement clinker in the manufacturing process. This follows by virtue of phase relations and is commonly illustrated by the quaternary phase diagram for the compounds $CaO$, $SiO_2$, $Al_2O_3$, and $Fe_2O_3$. However, the present state of the cement manufacturing art does not utilize cooling devices that permit crystallization of the cement phases according to conditions described by phase boundaries existing at cooling equilibrium as defined by the phase diagram. Also, the presence of trace materials may cause the material to behave substantially different than described by the phase diagram for pure materials. For these reasons it is necessary for the cement chemist to assume that the correct cooling conditions will exist in the commercial operation and proceed to design a kiln feed based on the potential amounts of cement phases as calculated by stoichiometric relations alone.

According to the present invention, the potential amounts of the four recognized compounds or phases in the clinker may be controlled and determined by the amounts of calcium, silica, aluminum, and iron in mix. It would be ideal if this could be done by proportioning such oxides in their pure form. Practice, however, establishes that these oxides can only be derived and obtained from natural materials or industrial waste materials and consequently the sought-for proportions are not readily achieved. In many cement operations, the desired range of the oxides depended upon to form the final end product can be satisfied by using such materials as limestone $CaCO_3$, shale ($Al_2O_3 \cdot SiO_2$), sand ($SiO_2$), and iron ore ($Fe_2O_3$) as the sources of the sought-for oxides. Each of these materials contains, as a usual thing, some of each of the four oxides desired. In many instances, the composition of one or more of the natural or available minerals is such that more than one source of a particular oxide is required to give the desired clinker composition. Further than this, it is possible under some conditions that as few as a single raw material only (such, for instance, as natural cement rock) can be used for making the desired type of portland cement.

For a final end-product to have specific desired characteristics, it is important that there be a control of all four oxides. If this is to be had, at least four separate raw materials should be used. Each material selected should be the predominant source of one of the oxides which will be required and this material must be used as the predetermined source of one of the oxides. If it is used in the quantity needed to supply the particular single oxide to the mix, it must not contribute more of any other oxide to the overall mix than the amount required of any of the other oxides.

Following the general principles hereinabove discussed, the control method is normally achieved through the use of feeder components arranged to convey proportioned raw materials to a group of mill feed bins and to provide for sampling this raw material feed continually by taking from the total feed a representative portion as a sample. The raw materials normally are supplied via an appropriate conveyor, such as a shuttle belt, to a plurality of mill feed bins. The diverted sampled material is fed in appropriate fashion to one of the commercial grinding mills which is designated as the primary sample mill. Pulverulent maerial from the sample mill is introduced to a classifier in the usual manner and the product stream (fines) has a small portion of it diverted by a secondary sampler to a secondary mill which is capable of delivering at least 10 grams of sample per minute. This finished sample is directed to an analyzing station where suitable indications are obtained relative to the chemical composition of the pulverized material presented to it with respect to all chemical elements having atomic numbers greater than 11. This is frequently done by X-ray spectrographic analysis and resolution. But more important, the analysis is an exact measure of the chemical composition of the total proportioned stream as it is placed into the mill feed bins. At some future time (when the material has transversed through the grinding mill) the average analysis over a given period of time will represent the composite analysis of the finished stream. When there are 10 mills operating in parallel a deviation of chemical composition in the proportioned material will be 10 times the magnitude of the resultant deviation occurring in the finished stream. That is, providing the proportioned error is corrected before starting to fill the next feed bin in the sequence. If such a proportioning error is equally distributed in the top of two mill feed bins in sequence, then the maximum error in chemical composition occurring in the finished stream will be twice as great as indicated in the previous example, but for the same amount of material, it will be only for half of that time duration. The analyzer provides signal output which may be supplied in any appropriate fashion as digital information to control the output of a computer device whereby comparison may be made between the instantaneous resultant signal and an optimum composition. This insures substantially instantaneous control and corrective action at the initial source of the ingredients, as fed to form the proportioned input of raw materials.

The single figure of the accompanying drawing schematically illustrates the invention in one of its preferred forms and represents one preferred form for deriving the desired end result.

If reference is now made to the accompanying drawing, the schematically represented supply sources 11 through 15, illustratively, may be regarded as sources of a supply of kiln dust, iron ore, sand, shale and limestone, respectively. The quantity or weight per unit time period of each of these materials as supplied to the mass flow sense and control and feeder conveyor lines 17 (conventionally shown) is fully known. Normally, the raw material is fed across the feeder lines, and then supplied to fall upon a guide conveyor 18, at the end of which, after sensing at 21, it is permitted to fall upon a movable shuttle belt 23 arranged to move back and forth along a path designated by the arrows. In this form of feed, the mix material schematically shown at 21 (at which point a sample is taken) when reaching the end of the shuttle belt falls off successively to drop into different ones of the mill feed bins 25.

For illustrative purposes the invention has been shown as comprising only five such bins, but this will be understood to represent only a few of the normally used bins which may number between 10 and 15 although this number is in no way limiting as far as the invention is concerned. Each bin may be assumed to feed a supply of mix of about forty tons per hour with each bin having approximately a four hour storage capacity. When a lesser number of mills and bins are used the volumetric capacity of the blender must be appropriately increased (for the tonnage involved) to provide the necessary back mixing to dilute chemical composition surges that are normally diluted by a large number of units operating in parallel.

The mill feed bins supply the input ingredients through the sampler and feed bins 25 into the various mills 22 through the mill feeders 28. The mill feeders are known generally as metering units. They are well known in the art. Grinding mills, such as those shown at 22, per se, are also well known in the art. They grind and pulverize input ingredients supplied from the feed bins 25. Output in the form of pulverized components is then fed to output control or classifier units 27 and then to a mixer line 35. The mixer line (conventionally represented) supplies all outputs to a blender unit 37, as mentioned. A portion of the supplied raw material is diverted by a gathering unit 25' to, travel along a path schematically shown at 26 thereby to fall into a grinding mill designated as the primary sample mill 26'. The supply by way of the gathering unit 25'' is thus a representation of the ingredients instantaneously supplied from the movable shuttle belt 23 to the several feed bins 25 in sequence. This supply from the gathering unit 25' is then fed continuously into the sample grinding mill 26'. The output of mill 26', representative of the average input to all grinding mills, constitutes the material of which analyses are to be made. The samples are derived from the sample mill 26' and fed by way of the schematically represented path 29 into a suitable X-ray or spectograph analyzer 31. The path is then back by way of conveyor 33 to a mixer line 35. The mixer line may be fed from any plurality of feed bins so long as its output finally reaches a blending station 37 from which the output is fed to the kiln by way of conveyor 39. Details of a blending station are well known in the art and are not included specifically herein.

The purpose of sampling and analyzing a portion of the raw output from the sources by means of the spectographic or X-ray analyzer 31 is to test the instantaneous composition of the proportioned stream of the input composition. In accordance with the signalling information derived from such analysis, and supplied to the schematically represented digital computer 41, it is possible immediately to determine the actual composition and compare this with a pre-established optimum. At the same time, when it is desirable to make necessary changes in the feed from the supply sources 11 through 15 in accordance with corrective action established by the computer mechanism 41, suitable controls of the feed mechanism from the supply source may be provided by way of the control paths 50. This control is normally in the form of an electrical circuit activated in accordance with the instantaneous output of the computer.

The computer thus serves to vary the instantaneous quantity of say, two or even more of the supplied materials in accordance with the need for the system whereby one of the desired system characteristics may be held constant or substantially constant regardless of the variance of the other compounds or phases.

Following the control, as above outlined, it now may be apparent that regardless of how many materials are being supplied to produce the kiln feed, it will be impossible to maintain precise concentration of all oxides in the mixer or clinker analysis unless the supplied materials are pure oxides, which they are not. Therefore, exact potential amounts of each of the cement phases in the clinker cannot be precisely maintained. Consequently, it becomes necessary to accept the premise that any composition control of the mix must tolerate at least some very small range of composition as departing from the precise rigidity of clinker specification control with respect to chemistry. The range of composition control can nevertheless be selected so that it produces an inconsequential variation on quality characteristics of the finished cement. This is one of the main aims and purposes of the invention. It often becomes a matter of substantial economic importance to fix the limits of clinker specifications, particularly where suitable raw materials are not easily available. It is with the foregoing thoughts in mind and particularly the selecting of the minimum cost combination that the computer, as hereinabove outlined, plays a significant part and becomes a particularly useful component.

Generally speaking, cement chemists have often accepted a mix where they based a holdpoint on the final carbonate content. These points were established by making checks on the clinker periodically to determine when their oxides required control action. A form of control of this character left much to be desired because it had to be based generally upon judgement and expxerience rather than upon the precise stoichiometric calculations, as above noted. Under the circumstances, the final errors in mix composition manifested themselves continually.

If a situation should be assumed where a cement plant produces a kiln feed from raw materials, such as limestone, shale, and iron ore, the component analysis of the clinker qualities may be interpreted as coming within the realm of disclosure of the following tables.

For clinker qualities reference may be made to the following table.

TABLE 1

|  | (a') | (b') | (c') |
|---|---|---|---|
| $C_3S$ | 55.8 | 18.3 | 31.7 |
| $C_2S$ | 18.9 | 53.2 | 42.1 |
| $C_3A$ | 10.8 | 12.9 | 11.0 |
| $C_4AF$ | 10.4 | 11.6 | 11.2 |
| $S_{28}$ | 6,222.0 | 4,716.0 | 5,252.6 |

In respect of feed component analyses the following table may be considered.

TABLE II

|  | Limestone | Shale | Ore | Kiln Dust |
|---|---|---|---|---|
| CaO | ($a_1$) 52.90 | ($a_2$) 2.36 | ($a_3$) 0.00 | ($a_4$) 52.46 |
|  | ($b_1$) 50.02 | ($b_2$) 2.36 | ($b_3$) 0.00 | ($b_4$) 52.46 |
|  | ($c_1$) 51.67 | ($c_2$) 0.74 | ($c_3$) 0.00 | ($c_4$) 52.46 |
| $SiO_2$ | ($a_1$) 1.73 | ($a_2$) 54.04 | ($a_3$) 10.40 | ($a_4$) 15.42 |
|  | ($b_1$) 3.80 | ($b_2$) 54.04 | ($b_3$) 10.40 | ($b_4$) 15.42 |
|  | ($c_1$) 2.64 | ($c_2$) 56.98 | ($c_3$) 10.40 | ($c_4$) 15.42 |
| $Al_2O_3$ | ($a_1$) 0.58 | ($a_2$) 14.62 | ($a_3$) 4.20 | ($a_4$) 5.6 |
|  | ($b_1$) 1.58 | ($b_2$) 14.62 | ($b_3$) 4.20 | ($b_4$) 5.6 |
|  | ($c_1$) 1.18 | ($c_2$) 13.41 | ($c_3$) 4.20 | ($c_4$) 5.6 |
| $Fe_2O_3$ | ($a_1$) 0.45 | ($a_2$) 6.54 | ($a_3$) 81.20 | ($a_4$) 2.76 |
|  | ($b_1$) 0.82 | ($b_2$) 6.54 | ($b_3$) 81.20 | ($b_4$) 2.76 |
|  | ($c_1$) 0.62 | ($c_2$) 6.87 | ($c_3$) 81.20 | ($c_4$) 2.76 |

The raw mix components may be represented by the following table.

TABLE III

|  | ($A_1$) | ($B_1$) | ($C_1$) |
|---|---|---|---|
| Limestone (percent) | 70.68 | 70.68 | 70.68 |
| Shale (percent) | 19.94 | 19.94 | 19.94 |
| Iron Ore (percent) | 0.32 | 0.32 | 0.32 |
| Kiln Dust (percent) | 9.06 | 9.06 | 9.06 |
| $CO_3$ (percent) | 76.1 | 72.50 | 74.0 |
| Burnability Index (B.I.) | 4.47 | 7.19 | 5.58 |

The foregoing tables show the quality of the clinker produced from the raw material compositions shown as ($a_n$), ($b_n$), and ($c_n$) particularly under columns (a'), (b'), and (c'). The percentage material in the final mix in each of the three cases is that shown in Table III. In all instances, they are based upon the proportioners holding the feed flow rate constant where the feed component composition is permitted to vary. The left-hand designations $C_3S$, $C_2S$, $C_3A$, and $C_4AF$ of Table I are, as previously mentioned, the four compounds or phases which must be considered in the preparation of portland cement. The designation of $S_{28}$ is a representation of the strength in p.s.i., of a two inch cube cast from cement manufactured in accordance with the selected process, if the cube has been permitted to set and harden, while subjected to controlled curing conditions for a 28 day period following its preparation.

From Table I, it will be noted that the values for $S_{28}$ listed are shown in p.s.i. It should further be noted that only the compounds shown in column a' will be satisfactory to meet most required strength tests. Those shown in the other columns would generally be regarded as substandard for the assumed example and present market requirements.

While the designation B.I. of a burnability index shown in column a' is the lowest of the group, it is the only one that falls within the range 4.2 to 5.0. This specified range is found to be the most suitable for most cement operations. The $CO_3$ designation is that of the percentage of carbonate, which for illustrative purposes the value shown as 76.1 may be assumed to be substantially an optimum although the values shown in columns $B_1$ and $C_1$ are possible. Table II shows the analyses of limestone, shale, iron ore, and kiln dust, with respect to the four major oxides. These are raw materials that are used to prepare mix (kiln feed) samples $A_1$, $B_1$, and $C_1$, all of which have raw materials combined in the percentages shown in Table III. When mixes $A_1$, $B_1$, and $C_1$ are properly burned and reacted in a kiln, they will produce a cement clinker having substantially the qualities described by those items shown in Table I. That is, clinkers $a'$, $b'$, and $c'$, are correspondingly from mixes $A_1$, $B_1$, and $C_1$, respectively.

Reference may now be made to two further tables for understanding the invention. The clinker qualities are set forth by the following table.

TABLE IV

|  | (a') | (b'') |
|---|---|---|
| $C_3S$ | 55.8 | 62.5 |
| $C_2S$ | 18.9 | 11.4 |
| $C_3A$ | 10.8 | 11.5 |
| $C_4AF$ | 10.4 | 10.6 |
| $S_{28}$ | 6,222.0 | 6,588.6 |

Raw mix characteristics are shown as follows:

TABLE V

|  | ($A_1$) | ($B_2$) |
|---|---|---|
| Limestone (percent) | 70.68 | 74.82 |
| Shale (percent) | 19.94 | 15.65 |
| Iron Ore (percent) | 0.32 | 0.32 |
| Kiln Dust (percent) | 9.06 | 9.21 |
| $CO_3$ (percent) | 76.1 | 76.1 |
| B.I. | 4.47 | 4.43 |

Raw material compositions ($a_n$) and ($b_n$) as shown in Table II are used to produce clinker specifications as shown in Table IV. These correspond to mixes shown in columns ($A_1$) and ($B_2$) respectively in Table V. In this instance, the data result from an effort to set out the calcium carbonate content as a control point. The calcium carbonate is held constant regardless of the changing nature of the mix components. This control would would be under the supervision of a cement chemist endeavoring to hold constant carbonate values by changing input materials. The resultant compositon and high strength, as seen by the value in column ($b''$) would be such to impair the life of the kiln lining. Such a strength of material, also, would exceed considerably that which is normally necessary or desirable according to established specifications (note the value of $S_{28}$ in column $a'$). Under the circumstances, while the cement chemist can generally maintain the mix components in such relationship (since stabilization of the carbonate is relatively easy) the approach is not the most satisfactory or suitable way to proceed. The chemist is faced with a situation where there is largely a loss of control, and what control there is becomes less than desirable so that the quality of the end-product is impaired.

Following the practices hereinabove outlined and those practices resulting from feeding a portion of the mix material into a grinding mill designated as a primary sample mill and thence a portion of that to an analyzer 31, the test data of Table VI showing as follows are obtained.

TABLE VI.—CLINKER QUALITIES

|  | (a') | (b''') |
|---|---|---|
| $C_3S$ | 55.8 | 55.9 |
| $C_2S$ | 18.9 | 17.7 |
| $C_3A$ | 10.8 | 11.7 |
| $C_4AF$ | 10.4 | 10.8 |
| $S_{28}$ | 6,222.0 | 6,304.5 |

TABLE VII.—RAW MIX CHARACTERISTICS

|  | ($A_1$) | ($B_3$) |
|---|---|---|
| Limestone (percent) | 70.68 | 74.31 |
| Shale (percent) | 19.94 | 16.31 |
| Iron Ore (percent) | 0.32 | 0.32 |
| Kiln Dust (percent) | 9.06 | 9.06 |
| $CO_3$ (percent) | 76.1 | 75.6 |
| B.I. | 74.47 | 4.61 |

Raw material compositions are the same as shown in Table III as compositions ($a_n$) and ($b_n$). These correspond to columns ($A_1$) and ($B_3$) respectively in Table VII.

The showing of Table VI is based upon a change being made in the proportions of feed components in the mix necessary to meet the desired clinker specifications. In this instance, through the use of the computer mechanism 41 effective to represent and analyze the output from the analyzer 31, it is possible by making comparisons to arrive at a final composition where the control of the mix is based upon any one of the selected compounds or phases. According to the table, the compound or phase of the tricalcium silicate ($C_3S$ as here designated) is held substantially constant. Here it will be noted that the selected weights of the tricalcium silicate for each of columns $a'$ and $b'''$ are substantially identical, the value represented in column $a'$ being 55.8 and that in column $b'''$ being 55.9. Following this proposal and bearing in mind that the clinker quality can be established by a control action maintaining one of the phases constant, the Table VI illustrates the departure from one composition to another which results when the oxide at one control point is held constant and does not necessarily represent a constancy of the other components.

In previous considerations, it has been customary to base control action on use of chemical qualities either of the clinker or the raw mix as primary controlled functions for the purpose of ultimate control of the quality of product produced, the optimizing of processing equipment performance with respect to cost and the optimizing total raw material cost. It is only with compositions of the proportions as in Tables VI and VII that strength characteristics of the finished product in the controlled stream approaches that of the desired specifications set forth in column $a'$. The comparisons shown in Tables VI and VII thus illustrate an important feature of this invention. The cement chemist cannot achieve such results since a more rapid and complex analysis is called for than is within the powers of a chemist.

From the foregoing analysis, it is possible to appreciate by virtue of the selection of the analysis achieved through the analyzer 31 and the digital computer 41 that the clinker quality may be maintained within a specified range. As shown by Table VII, the final percentage of the calcium carbonate varies only to a relatively minor extent between the compositions of its column $A_1$ and its column $B_3$, although the compounds or phases designated do vary to a substantially greater extent. Considering the percentage of the material in the mixes, the columns of Table VII showing the compositions ($A_1$) and ($B_3$) establish that percentagewise. The limestone variance and the shale variance may be the only two components which must be varied to achieve the desired end result. The clinker quality thus is not limited to the characteristics and specifications imposed by the market place but may include those characteristics that influence kiln and finish grinding mill performances. This establishes through the use of a system having the ability to monitor all oxide compositions in the mix and make a substantially immediate determination of the clinker composition and characteristics which will result that are appropriate control action will be initiated at once in the event the end-product is outside the specification range. This, of course, is done sufficiently fast that no kiln feed will result which would cause any significant disturbance in the overall kiln operation or cause an inferior or undesirable product to be produced.

In the following illustration it is assumed that there are thirteen grinding mills (although this is presented merely illustratively and not by way of limitation) operating in parallel and it is also assumed that a complete filling cycle of the feed bins is made hourly, then each bin of the group is filled in approximately 4.6 minutes. Commercially available on-line X-ray spectrograph analyzers of known type are used to produce accurate chemical analyses of a pulverulent material from a continuous stream at from substantially 1 to 5 minutes automatically and continuously. The following examples will illustrate the control philosophy of this invention; it is established that control action will be taken at 15 minute intervals to the degree required. Leading up to this time the analyzer and associate computer components establish chemical composition trends during the 15 minute time period and compare this with the desired value, error between the two will be computed, the necessary proportioner adjustment determined and the appropriate control action initiated. Thus in each 15 minute interval past error will be corrected. Since filling of feed bins is on a one-hour cycle, the 15 minute error will be diluted by 45 minutes of other proportioned material. Such control dilutes all errors in the assumed example to 25% of the original amount with respect to the composite composition of the other 45 minutes of material. The system is programmed to interpret normal operations and recognize that an emergency exists when the measured compositions are found to be outside of specified ranges. In such a case, immediate corrective action is taken and if this is found to be impossible, the system is automatically shut down until manual intervention corrects the difficulty. It can readily be seen that the above example is only one of a number of possible cases. Times required for the different phases will necessarily depend on the number of grinding mills involved, speed of the analyzer, sample transit time, mill feed bin fill cycle time, and control action response time.

The general plan of setting up the computer testing and control is according to a particular selected pattern. By this pattern information setting out optimum composition characteristics is stored in the computer. Comparisons are made following each testing or analysis between this optimum and that instantaneously present. The comparison, per se, follows known computer technique by which the instantaneous composition or element analysis is also supplied to the computer. Then, in known fashion the instantaneous supplies data are resolved against such stored information as a standard. This process is generally known as the iterative technique in computer operations. It comprises the mathematical method of solving simultaneous equations and reaching a summing analysis as a result of the investigation.

Illustrative of the operation, certain requirements of the system are known. For these there is a maximum and a minimum used to establish the limits of operations. In one operation the limits may be set for the $C_3S$ and the ash, which is the allowance for coal ash in the clinker from the fuel supplied. Then, a maximum and minimum is normally established for the burning index (usually referred to as "B.I.") as well as the set for 28 days (this is normally known chemically as $S_{28}$). There is also established a maximum for $C_3A$ and an indication of the total percent of the oxides (such as CaO, $Al_2O_3$, $SiO_2$ and $Fe_2O_3$) in the clinker. It is also desirable to know the percent of lime saturation with respect to the three other oxides. This is known as the factor K which was first introduced by Kuhl and is well known in the industry. The equation is:

$$K = \frac{100 CaO}{2.8 SiO_2 + 1.1 Al_2O_3 + 0.7 Fe_2O_3}$$

There is also a summing analysis and one specifying the converting costs to a volatile free basis. The summing analysis and converting cost to a burn-free basis, chemically "VFB," with which the ingredients of the limestone, the iron ore, the sand, the coal ash and the shale are considered.

These data are first supplied to the computer and from the analysis made it can be determined and established almost instantly what raw materials will provide the desired product specifications. In the solutions which result, the computer then, by following well recognized computer principles, provides information of the input raw materials which will be supplied from the supply bins 11 through 15 on the so-called "as received basis." Under the circumstances it is then possible to obtain information as to the actual composition of each of the four cement phases or compounds, as well as the raw materials required. From this, through the computer, full information is also derived as to the various factors such as the burnability index for which the formula was originated by Wilsnack and is well known. This burnability index ("B.I.") is represented as follows:

$$B.I. = 0.2727 \times \frac{(C_2S)_x}{C_x} + 0.1194 L_{2550} + 0.1403 A/F$$

From the foregoing the terms in the equation may be defined as follows:

$$\frac{(C_2S)_x}{C_x} = \frac{2.8665S - 0.7338A - 0.1760F}{C - 1.8665S - 1.2140A - 1.0667F}$$

Where S, A, F and C represent respectively $SiO_2$, $Al_2O_3$, $Fe_2O_3$ and CaO.

In the foregoing equation $$L_{2550} = 2.943A + 2.250F$$

The term $A/F$ represents the ratio of percent of alumina to the percent iron in the clinker. The first three terms above are listed in the desired clinker specification, namely, $S_{28}$, $C_3S$ and $C_3A$. They are qualities that establish the performance of the portland cement produced from the operation. The other terms, that is, K, $A/F$ and B.I. are factors that, while they do influence the quality of the product, they also have a significant effect on the conditions required in the process to satisfactorily complete the chemical reactions involved.

The computer per se is generally in that form which well recognized computer devices normally operate. As such the computer contains circuitry and mechanism which is designed to time the electrical impulse. The produced electrical impulses in turn, will drive a servo-motor (not shown) of any well known type. They may drive the set-point of a control station such as shown at 17, 19, or 49, of any desired form up or down scale. This provides what is known in the industry as the "slew" or trim adjustment. Adjustment is based upon an electrical impulse of relatively long duration which can give a major slew adjustment and also upon an electrical impulse of much shorter duration to provide the similar "trim" or vernier adjustment.

By another technique the control adjustment from the computer may be provided by what is known as the "pulse train" method. This method is based upon a digital type of electrical impulses being transmitted from the computer to the control station. The number of impulses received by the control station is proportioned to the amount of errors existing between the old and a desired set-point. In this form the adjustment is then determined by the operation of the produced pulses and how far it is desirable to drive the set point at that particular time.

From the foregoing, therefore, it should be apparent that it is possible to produce a correct amount of each oxide in the common kiln feed stream substantially all the time even though one or more of the individual mills may be producing a mix which is significantly apart from the desired mix composition at any one instant. Consequently, all that is required is that all of the streams be blended together as one thus eliminating complete back-mixing in view of the fact that the overall position cannot be expected to change significantly with respect to time.

There are varied modifications of the proposal which may of course be made within the teachings of this disclosure and it is intended that the scope of the claims hereto attached shall thus be broadly construed in the light of the possibilities.

Having now described the invention what is claimed is:

1. The method of controlling the chemical composition of pulverulent material formed by comminution of at at least two supplied streams of ingredients proportioned together which comprises feeding the selected ingredients in approximated quantities continuously to a plurality of storage bins in sequence, pulverizing the ingredients from the storage bins in each of a plurality of parallel paths, sampling the ingredients of the feed prior to its passage to one of the pulverizing paths, analyzing the pulverized sampled ingredients, recombining all pulverized materials in a common output, and then controlling the supplied ingredients in each of the supply streams in accordance with departures from a pre-set optimum composition of the analyzed ingredients of the composition.

2. A method of controlling the composition of pulverulent material formed by comminution of a plurality of ingredients supplied in a flow path to a plurality of grinding regions which comprises feeding a plurality of different ingredients along a supply path to a plurality of storage regions, continuously sampling the supplied ingredients, and feeding the sampled materials to an additional parallel flow path, grinding all of the combined materials simultaneously on the separate flow paths, analyzing the comminuted ingredients supplied along the sample path thereby to determine departures in the ingredient composition thereof from a pre-established optimum value, combining the instantaneous comminuted output of all of the grinding operations and supplying the composition to a blender, and controlling the instantaneous supply of each of the unprocessed ingredients in accordance with the composition departure of the analyzed sample from an optimum value.

3. The method of controlling the chemical composition of pulverulent material resulting from comminution of at least two supply streams of ingredient material proportioned together to provide the source of elements for a final mixture which comprises the steps of pulverizing the input ingredients in a plurality of grinding operations functioning in parallel, supplying the ingredient feed to the parallel grinding operations in a sequential manner, concurrently and separately pulverizing a sample of the input ingredients to all of the parallel pulverizing grinding operations, analyzing the separately pulverized sample, comparing the analyzed sample composition analysis with a pre-established optimum composition to derive control data indicative of all variances, modifying the ingredient supply stream in a direction to maintain the optimum composition, and recombining all pulverized ingredients into a single stream for kiln feed.

4. The method of controlling the chemical composition of pulverulent material resulting from comminution of at least two supply streams of ingredient material proportioned together to provide the source of elements for a final mixture which comprises the steps of storing input ingredients to a plurality of grinding operations functioning in parallel, supplying the ingredient feed to the storing point in a sequential manner, concurrently gathering a sample of the mixture of input ingredients supplied in sequence to all of the storing points, feeding ingredient mixture continually in parallel paths through a pulverizing operation, analyzing the pulverulent sampled ingredient mixture separately from all other parallelly pulverized ingredients, comparing the analyzed composition of the sample with a pre-established optimum composition to derive control data indicative of all variances between the sample and an optimum, modifying the ingredient supply stream in a direction to maintain the optimum composition, and recombining all pulverulent ingredients into a single stream for feed to a utilization point.

5. The method of controlling the chemical composition of pulverulent material resulting from comminution of at least two supply streams of ingredient material proportioned together to provide the source of elements for a final mixture which comprises the steps of storing a supply of mixture ingredients separately for each of a plurality of comminuting operations and then feeding material from each supply for simultaneously comminution in a plurality of parallel operations, supplying the ingredient feed to the supply for the parallel comminuting operations in a sequential manner, diverting a portion of the supply to a separate comminuting operation providing an output indicative of the average of all the parallel comminutions, analyzing the separately comminuted sample to provide a record of the instantaneous ingredient supply, comparing the analyzed sample composition analysis with a pre-established optimum composition to derive control data indicative of all composition variances, modifying the ingredient supply of at least one of the streams in a direction to maintain the optimum overall composition, and recombining all comminuted ingredients into a single stream for feeding a load.

6. A method of controlling the chemical composition of a supply to comminuting apparatus of a selected number of raw material ingredients each of which may contain undertermined portions of the other materials and which materials are adapted to be selectively proportioned in a final mix so that a control of the final composition may be based upon the characteristics of one material of the group which comprises the steps of continually analyzing the selected sample mix to determine the characteristics of the supplied components using at least one ingredient as a base for reference, comparing the derived information with an optimum for the composition as a whole, determining departure trends of each ingredient from a selected norm, and controlling the proportions of each ingredient material supplied for combination to the mix is such that the overall mix ingredients retain the selected optimum characteristic.

7. A method of controlling chemical composition feed of a selected number of raw material ingredients each of which may contain undertermined portions of the other materials and which materials are adapted to be selectively proportioned in a final mix so that a control of the final composition may be based upon the characteristics of one material of the group which comprises the steps of feeding approximately proportioned raw materials as a supply into a plurality of storage bins, sampling the supplied composition for identification of chemical compositions, continually analyzing the selected sample to determine the chemical characteristics of the supplied components using at least one ingredient as a base for reference, comparing the characteristics of the composition instantaneously present with optimum characteristics, determining departure trends of each ingredient from a selected norm, and then controlling and modifying the proportions of the raw materials supplied so that the final mix composition includes ingredients in modified quantities combining to retain substantially the optimum chemical characteristics of the total.

8. A method of controlling chemical composition feed of a selected number of raw material ingredients each of which may contain undetermined portions of the other materials and which materials are adapted to be selectively proportioned in a final mix so that a control of the final composition may be based upon the characteristics of one material of the group which comprises the steps of feeding approximately proportioned raw materials sequentially as a supply into a plurality of storage bins, continually sampling the supplied composition for all of the storage supplies for classification, continually analyzing the selected sample to determine the characteristics of the supplied components using at least one of the ingredients as a base for reference, registering the information of the composition as a whole under the individual ingredients in a computer, determining departure trends of each ingredient from a selected norm, and then controlling the proportions of all ingredient material when combined in accordance with information showing the departure of the composition of one of the mix ingredients thereby to achieve optimum characteristics of the total.

9. Apparatus of controlling chemical composition feed of a selected number of raw material ingredients each of which may contain undetermined portions of the other materials and which materials are adapted to be selectively proportioned in a final mix so that a control of the final composition may be based upon the characteristics of one material of the group which comprises means for sequentially feeding approximately proportioned raw materials as a supply mixture into a plurality of storage bins, means for continuously sampling the supplied composition mixture for classification and analysis, means for continuously analyzing the selected mixture sample to determine the composition characteristics of the individually supplied ingredients, means to register instantaneous departures of the mixture from an optimum, means for modifying the supply quantity of the individual ingredients under control of departure trends of each ingredient from a selected norm so that the proportions of all materials when combined retain substantially like overall chemical characteristics independently of the departure of one of the mix ingredients from the initial characteristics.

10. Apparatus for controlling the supply of individual ingredients of a mix to maintain a selected chemical composition feed where the individual raw material ingredients may each contain undetermined portions of the other materials and all materials are adapted to be selectively proportioned in a final mix so that a control of the final mix composition may be based upon the characteristics of one material of the group which comprises means for supplying a group of approximately proportioned raw materials to provide a controlled composition, means for sampling the supplied composition for identification of its chemical characteristics, analyzing means for exploring individually the selected sample to determine characteristic composition changes from time to time of the supplied individual components, means for comparing such determined characteristics with an optimum using one selected range as a base for reference, and means for controlling the supply of each individual material so that, when combined in accordance with registered information showing the departure of the composition one of the mix ingredients, the optimum characteristics of the total may be maintained.

11. Apparatus for controlling the chemical composition of pulverulent material resulting from comminution of at least two supply streams of ingredient material proportioned together to provide the source of elements for a final mixture which comprises means including pulverizing a plurality of comminuting mills for pulverizing the input ingredients simultaneously, a plurality of storage supply bins for supplying the mills continually, feed means for supplying the ingredient feed to the storage bins from a common supply source in a sequential manner, means for concurrently and separately diverting a sample of the input ingredients as sequentially supplied to the storage bins, means for comminuting the sample, means for analyzing the separately comminuted sample for identifying ingredient proportions, means for comparing the analyzed sample composition analysis with a pre-established optimum composition to derive control signals indicative of all variances, means for modifying the ingredient supply of at least one of the supply streams in a direction to maintain the optimum composition, and means for recombining all comminuted ingredients into a single stream for supply to a use point.

12. The method of controlling the chemical composition of pulverulent material formed by comminution of at least two supplied streams of ingredients proportioned together which comprises feeding a mixture of selected ingredients in approximated quantities continuously to a plurality of storage bins in sequence, pulverizing the mixture of ingredients from the storage bins in a plurality of parallel paths, sampling the feed mixture after proportioning of the ingredients, pulverizing and analyzing the sampled mixture, adjusting and controlling the quantity of supplied ingredients in each of the supply streams in accordance with departures from a pre-set optimum composition of the analyzed mixture of ingredients, and recombining all pulverized materials from the parallel paths in a common output.

13. A method of controlling the chemical composition of pulverulent material formed by comminution of a mixture of a plurality of ingredients supplied in a flow path to a plurality of grinding regions which comprises feeding a plurality of different ingredients along a supply path to a plurality of storage regions, continuously removing a primary sample of the mixture of supplied ingredients, and feeding the primary sampled materials to an additional parallel flow path, grinding all of the combined materials simultaneously on the separate flow paths, collecting from the pulverized primary sample a secondary sample representative of the entire original mixture, analyzing the comminuted ingredients supplied along the sampled path thereby to determine departures in the ingredient mixture composition thereof from a pre-established optimum value, controlling the instantaneous supply of each of the unprocessed ingredients in accordance with the composition departure of the analyzed ingredient mixture sampled from an optimum value, combining the instantaneous comminuted output of all of the grinding operations and supplying the composition as an output of the complete operation.

14. The method claimed in claim 6 wherein the analysis of the selected sample is to determine its chemical characteristics.

15. The method claimed in claim 8 wherein the identification is that of a chemical composition.

16. The apparatus as claimed in claim 11 wherein the comparing means comprises
means to analyze the chemical composition of the supplied ingredients.

17. The method of controlling the chemical composition of pulverulent material formed by comminution of at least two supplied streams of ingredients proportioned together which comprises feeding the selected ingredients in approximated quantities continuously to a plurality of storage bins in sequence, pulverizing the mixture of ingredients from the storage bins in a plurality of parallel paths, sampling each of the ingredients of the feed prior to proportioning the ingredients, pulverizing and analyzing the sampled ingredients, adjusting and controlling the quantity of supplied ingredients in each of the supply streams in accordance with departures from prior measured chemical composition of the analyzed ingredients, and recombining all pulverized materials from the parallel paths in a common output.

18. The method of controlling the chemical composition of pulverulent material formed by comminution of at least two supplied streams of ingredients proportioned together which comprises feeding a mixture of selected ingredients in approximated quantities continuously for comminution and pulverization, sampling the pulverized mixture, analyzing the sampled mixture, adjusting and controlling the quantity of the supplied ingredients in each of the supply streams in accordance with departure from a pre-set optimum composition for feeding to an output.

19. The method of controlling the chemical composition of pulverulent material resulting from comminution of at least two supply streams of ingredients material proportioned together to provide the source of elements for a final mixture which comprises the steps of pulverizing the input ingredients in a plurality of separate grinding operations, concurrently and separately pulverizing a sample of the input ingredients to all of the pulverizing grinding operations, analyzing the separately pulverized sample, comparing the analyzed sample composition analysis with a pre-established optimum composition to derive control data indicative of all variances, modifying the ingredient supply stream in accordance with the analysis in a direction to maintain the optimum composition and recombining all pulverized ingredients into a single stream for kiln feed.

20. The method of controlling the chemical composition of pulverulent material resulting from comminution of at least two supply streams of ingredient material proportioned together to provide the source of elements for a final mixture which comprises the steps of storing a supply of mixture ingredients separately for each of a plurality of comminuting operations and then feeding material from each supply for comminution, supplying the ingredient feed to the supply for the comminuting operations in a sequential manner, diverting a portion of the supply to a separate comminuting operation providing an output indicative of the average of all the comminutions, analyzing the separately comminuted sample to provide a record of the instantaneous ingredient supply, comparing the analyzed sample composition analysis with a pre-established optimum composition to derive control data indicative of all composition variances, modifying the ingredient supply of at least one of the streams in a direction to maintain the optimum overall composition, and recombining all comminuted ingredients into a single stream for feeding a load.

21. The method of controlling the chemical composition of pulverulent material formed by comminution of at least two supplied streams of pulverized ingredients which comprises feeding the selected ingredients in approximated quantities continuously to a plurality of storage bins, pulverizing the feeding from the separate bins to provide an approximate mixture of the ingredients from the storage bins from a plurality of parallel paths to form in a common path, sampling the feed mixture after proportioning of the ingredients from the parallel paths, pulverizing and analyzing the sampled mixture, adjusting and controlling the quantity of supplied ingredients in each of the supply streams in accordance with departures from a pre-set optimum composition of the analyzed mixture of ingredients, and recombining all pulverized materials from the parallel paths in a common output.

References Cited

UNITED STATES PATENTS

| | | | |
|---|---|---|---|
| 2,766,939 | 10/1956 | Weston | 241—34 |
| 2,965,316 | 12/1960 | Henderson et al. | 241—34 |
| 3,153,587 | 10/1964 | Schuerger | 241—33 |
| 3,179,345 | 4/1965 | Kivert et al. | 241—34 |
| 3,314,614 | 4/1967 | Daniel et al. | 241—34 |

FOREIGN PATENTS 928,104   6/1963   Great Britain.

GERALD A. DOST, *Primary Examiner.*

U.S. Cl. X.R.

241—34, 135